UNITED STATES PATENT OFFICE.

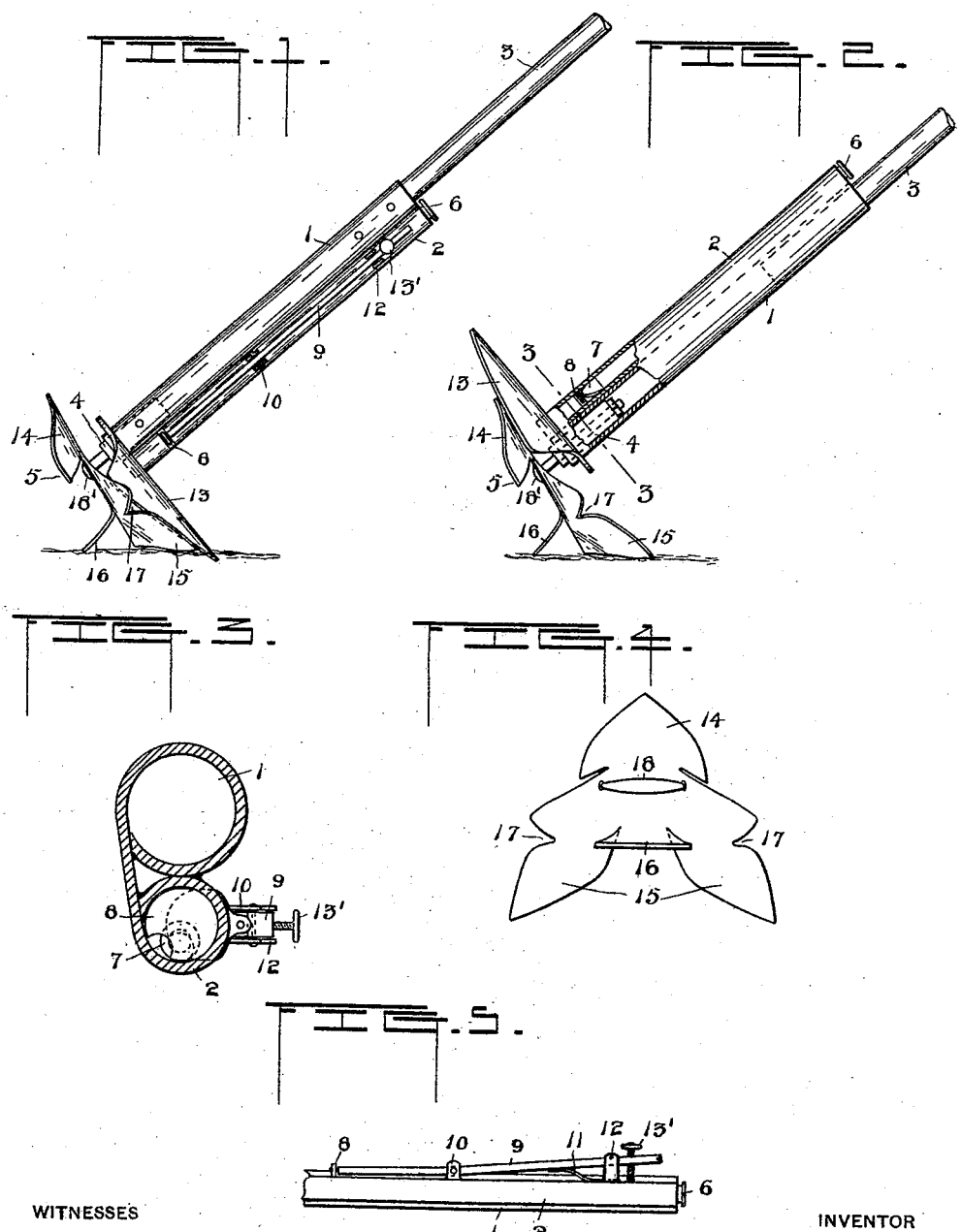

GARRET J. OLENDORF, OF COOPERSTOWN, NEW YORK.

HAND SEED-SOWER AND WEEDER.

SPECIFICATION forming part of Letters Patent No. 543,699, dated July 30, 1895.

Application filed December 14, 1894. Serial No. 531,842. (No model.)

*To all whom it may concern:*

Be it known that I, GARRET J. OLENDORF, a resident of Cooperstown, in the county of Otsego and State of New York, have invented certain new and useful Improvements in Hand-Planters; and I do hereby declare the following to be a full, clear, and exact description of the invention, such as will enable others skilled in the art to which it pertains to make and use the same.

The invention relates to hand-planters, and has for its object to increase the capabilities of such devices and to adapt them to various functions in seeding, planting, and hoeing or cultivating; and it consists in the construction hereinafter described and particularly pointed out.

Figure 1 is a side elevation. Fig. 2 is a similar view, a part being broken away and parts being differently adjusted. Fig. 3 is a section on line 3 3 of Fig. 2. Fig. 4 is a plan of a tool, and Fig. 5 is a partial plan.

Numerals 1 and 2 indicate the members of a double tube, the individual tubes being, in the present instance, of unequal diameter. They are conveniently and cheaply made by suitably bending a single sheet of metal, as shown, the folded edges being secured in any usual manner. Other features of the invention are not, however, limited to this particular method of forming the tubes, though it is preferred, for the reason that the intermediate portion of metal holds the tubes in fixed relation, excludes dirt laterally on one side, and strengthens the structure.

Tube 1 is closed at its ends by handle-sections 3 and 4. The latter is adapted to receive the shank of a tool 5, which may properly be called a "hoe," since hoeing or weeding is one of its important functions. The tool may be secured by a nut 18', as indicated.

The tube 2 is intended for use as a magazine for seeds, and has a removable cap or plug 6. Its lower end has, preferably, a perforated diaphragm or hopper 7, normally covered by a valve 8. This valve is operable by means of a lever 9, which has a fulcrum or pivot in the bracket 10, secured to the tube or tubes.

11 denotes a spring to close the valve, and 12 is a bracket-guide for the valve-lever, and 13' an adjustable regulating screw or stop to limit the inward movement of the lever, and consequently serving to limit the degree to which the valve may be opened. In operation this lever enables the hand of the user of this implement to open the valve to discharge seed at will, and the quantity discharged at each act of opening can be regulated by suitably determining the extent to which the valve can be moved.

The two tubes 1 and 2 are firmly secured to a concave shovel-shaped pointed blade or hoe 13. This is primarily designed to open a furrow or to make any suitable bed for the seed.

The tool or hoe 5 has a part 14 shaped similarly to hoe 13 and adapted to follow in the furrow made by the latter, with the effect to make fine the soil and mix the seed therewith in the bottom of said furrow.

15 15 denote wings which can be drawn lengthwise over the previously-formed seed-furrow to cover the seed, and 16 is a trailing device adapted to level and slightly compact the crest of the ridge formed by the covering-wings. These wings are provided with pointed extremities to adapt them for use in cultivating, such form permitting them to be used to stir the said surface and to pick out small weeds from between the growing plants.

Notches 17 are provided to enable strongly-rooted and tough weeds to be seized therein and pulled out.

The duplex arrangement of the blades 15, each provided with a notch, secures advantages not incident to the use of a single blade and notch such as heretofore proposed. The hoe is thereby particularly fitted to work between rows where, because of the height of the plants or for any reason, it is desirable to cultivate the proximate sides of two rows without reaching over to the other side of either. In such work the blades can each be employed on its own side without changing hands or crossing a row. Small weeds between the hills on one side of a row can thus be covered or uprooted by a blade 15, and larger ones can be pulled by the use of the notch, while small weeds between the rows can be covered by the co-operation of the blades and the earth leveled and pressed down by the coverer 16.

In using the part 5 as a hoe it is preferably detached from the seeder and provided with a separate handle; or the same handle may be used either with or without the seed-reservoir tube and without blade 13 in case these latter devices are made separable. If used as a hoe with the seeder attached, the implement will be turned one-half around in the act of cultivating or weeding, so that the blade or hoe 13 will be uppermost.

It may be desirable to use hoe 14 with the seeder at the first hoeing to replant where the seed of the first sowing failed; and in some cases the seeder can be used at the last hoeing in case a later and different crop is desired—as, for example, turnips after early garden corn.

While the two wings of the tool 14 counterbalance each other and co-operate in closing an open furrow when used as a seeder in the first planting, they also have the incidental advantage that in cultivating they can be used between rows with a minimum movement, as each blade is normally held in proximity to the plants in a row, as above set forth.

The shank is provided with a head 18, extended laterally a third or more of the corresponding dimension of the tool in order to support and brace the blades.

It will be understood that my improved device is primarily intended for garden use, though not limited to such use.

Having thus described my invention, what I claim, and desire to secure by Letters Patent, is—

1. In a garden tool comprising a seed dropper, the blade 13, situated in front of the seed discharge, in combination with the covering device having the two wings 15, 15, substantially as set forth.

2. In a garden tool comprising a seed dropper, the blade 13, situated in front of the seed discharge in combination with the covering device having the two wings 15, 15, and having the furrow leveling device 16, substantially as set forth.

3. The cultivating tool having two pointed wings 15, 15 similar and symmetrically arranged and means for securing a handle on a middle line between them whereby each may be held near a row in cultivating and whereby the said wings may be used when desired to draw dirt together to cover weeds or close a furrow, substantially as set forth.

4. The cultivating tool having two pointed wings 15, 15, similar and symmetrically arranged and means for securing a handle on a middle line between them and a leveling device 16 whereby each may be held near a row in cultivating and whereby the said wings may be used when desired to draw dirt together to cover weeds or close a furrow and whereby the dirt so moved can be leveled, substantially as set forth.

5. The cultivating tool having two pointed wings 15 15 similar and symmetrically arranged and means for securing a handle on a middle line between them whereby each may be held near a row in cultivating and whereby the said wings may be used when desired to draw dirt together to cover weeds or to close a furrow, the wings having each a weed pulling notch 17, substantially as set forth.

6. The garden tool having a blade 13, a seed tube 1, a handle or handle receptacle 2, said tube and handle extending through the blade, and a seed covering device secured to said handle and provided with furrow closing wings, substantially as set forth.

7. In a garden tool a handle comprising the contiguous tubes 1 and 2 made of a single piece of sheet metal suitably bent, one of said tubes being provided with seeding devices and the other with a seed covering device, substantially as set forth.

In testimony whereof I have signed this specification in the presence of two subscribing witnesses.

GARRET J. OLENDORF.

Witnesses:
ALVIN A. FLEMING,
PORTER W. SACKETT.